Sept. 1, 1970

J. J. CODICHINI 3,526,791

LOW NOISE CONTROLLER

Filed Jan. 19, 1968

INVENTOR

Joseph J. Codichini

BY

Mortenson and Weigel

ATTORNEYS

United States Patent Office 3,526,791

Patented Sept. 1, 1970

3,526,791

LOW NOISE CONTROLLER

Joseph J. Codichini, Kennett Square, Pa., assignor to Hewlett-Packard Company, Palo Alto, Calif., a corporation of California Filed Jan. 19, 1968, Ser. No. 699,144

Int. Cl. H03k *17/72*

U.S. Cl. 307—310 4 Claims

ABSTRACT OF THE DISCLOSURE

To control power passed to a load, the signal from an alternating current source of line voltage is full wave rectified and used to drive a normally saturated transistor to cutoff at the zero-crossover times of the line voltage. Upon cutoff, the output of the normally saturated transistor gates a switching transistor to apply a relatively narrow energizing pulse to the input of a bridge sensing circuit. The degree of balance of the bridge circuit depends upon variations of a sensed physical condition (temperature) in a system to be controlled. Any unbalance of the bridge, therefore, is sensed only at the zero-crossover times of line voltage. If an unbalance calling for more power exists, the energizing pulse passes to the output of the bridge and is applied to the switching input of a controlled rectifier. The ouput of the controlled rectifier is applied to the heating element, for example, of an oven whose temperature is being controlled.

This invention relates to a control circuit for low noise, controlled rectifier systems and, more particularly, to a circuit for providing an output from an alternating current source which output varies in accordance with variations of a system from a preselected physical condition.

For many years switching elements such as thyratrons, controlled rectifiers, and the like, and more recently triacs, have been employed to control the power which passes from an alternating current (A.C.) source to a load. In many applications it is desirable that the switching of the controlled rectifier occur at or near the zero-crossing time to point of the signal from the A.C. source. By switching during the interval of zero crossing of the signal from the alternating current power source, radio frequency interference or noise as a result of the switching is greatly reduced. This reduces the need for elaborate radio frequency line filters or shielding which is often used to eliminate the effects of this radio frequency noise. Shielding is not only desirable but essential when the controlled rectifier power supply is used in conjunction with relatively sensitive electronic instruments such as electrometer amplifiers, for example.

These switching elements are often controlled in some particular application in accordance with variations of the system or process from a preselected physical condition. These variations are detected using a sensing element disposed in a bridge circuit. The degree unbalance of the bridge circuit is a function of such variations. Unfortunately the sensitivity of the bridge circuit to changes in the physical condition often is limited. High sensitivities can be obtained by increasing the current flow through a heat senstive element, for example, but this means the power ratings of the circuit components must be increased. Furthermore, the power supply components necessary to operate such bridge sensor networks also require the use of higher power rated components and heat sinks. All of these requirements add to the cost and bulk of the system. Also, relatively expensive pulse generation circuitry is required to actuate the switching elements at the zero-crossover times.

It is, therefore, an object of this invention to obviate many of the disadvantages of the prior art control circuits.

Another object of this invention is to provide an improved, low cost circuit for varying the output from an alternating current source in accordance with variations of a system from a preselected physical condition.

BRIEF DESCRIPTION OF THE INVENTION

In accordance with a preferred embodiment of this invention, a pulse generator responds to the zero-crossover times of an alternating current signal to generate energizing pulses in synchronism therewith. Each energizing pulse excites a detecting means to sense variations of a process from a preselected physical condition. The output of the detecting means, an electrical pulse signal, controls a switching means connected to the alternating current source. Switching of the current from the source occurs in synchronism with the zero-crossover points and according to variations from the preselected physical condition.

This system has the advantage of eliminating radio frequency (R.F.) interference which normally results if switching occurs at other than the zero-crossover times. By using a pulse to energize the sensor, higher sensitivity is possible because large currents can be employed over the short duty cycle of the pulses without creating overheating of the components of the detecting system. Furthermore, since the duty cycle is low, power supply components having relatively small power ratings may be used. Finally, the need for additional pulse generating circuitry normally employed in control circuits of this type is eliminated.

BRIEF DESCRIPTION OF THE DRAWINGS

The novel feaures which are considered to be characteristic of this invention are set forth with particularity in the appended claims. The invention itself, however, both as to its organization and method of operation, as well as additional objects and advantages thereof, will be best understood from the following description when read in connection with the accompanying drawings in which:

DESCRIPTION OF THE PREFERRED EMBODIMENTS

Figure 1:
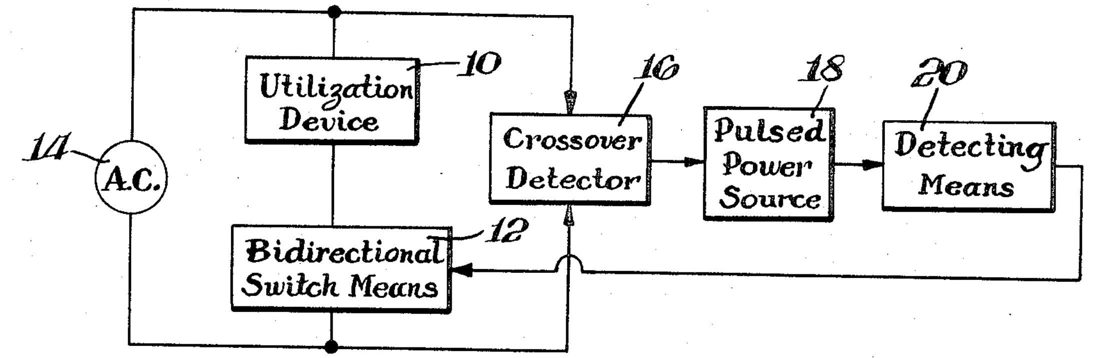
FIG. 1 is a block diagram of a circuit constructed in accordance with this invention.

In FIG. 1 there is seen a control system which includes a utilization device, such as the electric heater of an oven, illustrated by the block 10, connected in series with a bi-directional switch means 12 illustrated by the block 12. The switch means 12 may be a triac or a pair of silicon controlled rectifiers oppositely poled and connected in parallel, each being actuated through a separate pulse transformer for isolation. The utilization devcie 10 and bi-directional switch means 12 are connected in series and across a source of alternating current illustrated by the circle 14 labelled A.C.

A crossover detector, illustrated by the box 16, also is connected across the source of alternating current 14. The crossover detector 16 provides an output signal in synchronism with the zero-crossover times of the signal from the alternating current source 14. This output signal actuates a pulsed power source denoted by the block 18 which in turn energizes a detecting means, illustrated by the block 20, with a series of pulse signals having a relatively short duty cycle. The detecting means 20 includes a sensing element (not shown) which responds to variations of the physical condition of the utilization device, process or system to be controlled. For example, if the utilization device is an oven, variations in oven temperature from a preselected value are sensed. The process variable need not be temperature. It might be direction or course of a vehicle or the like. Whatever the variation, it is sensed by the detecting means 20 which converts the variation into an impedance change. The pulse signal, which is applied across the impedance, then is either passed or not according to the process' variation from the preselected condition, and applied as a switching pulse to the bi-directional switch means 12. Any unbalance in the detecting means 20 hence is sensed at the zero-crossover point of the line voltage.

In the case where the utilization device is an oven and an unbalance occurs in the detecting means 20 calling for more heat, a switching pulse is automatically generated at the output of the detecting means 20 to energize the switch means 12. When the switch means fires, a voltage signal starting at the zero-crossover point of line voltage is applied to the heating element in the utilization device 10. The application of the voltage to the heater over successive half cycles of the line voltage increases the oven temperature causing the sensor resistance to increase until a new null is established in the detecting means. The switch means is no longer actuated by the zero-crossover pulses.

This system illustrated in FIG. 1 offers many advantages. To begin with, since the switching occurs at the zero-crossover points, R.F. interference is substantially reduced. By adjusting the pulsed power source 18 to generate pulses having a relatively low duty cycle, large current surges can pass through the sensor of the detecting means 20 without creating significant heating due to the $I^2R$ losses. Large current pulses increase the sensitivity of the sensing element to a higher degree than is possible using D.C. voltages across the same sensing element and bridge circuit.

Due to the use of relatively low duty cycle pulses, the power supply components may have a relatively small power rating as compared to those normally required. The normal requirement to utilize, or of utilizing, large power resistors and heat sinks to dissipate the heat is substantially eliminated. Also, by actuating the detecting means 20 with a pulse, the usual additional pulse generating circuitry normally required to fire the switching elements is substantially obviated. The only pulse generator required is that which applies the pulse voltage to the detecting means 20 at the zero-crossover times.

Figure 2:
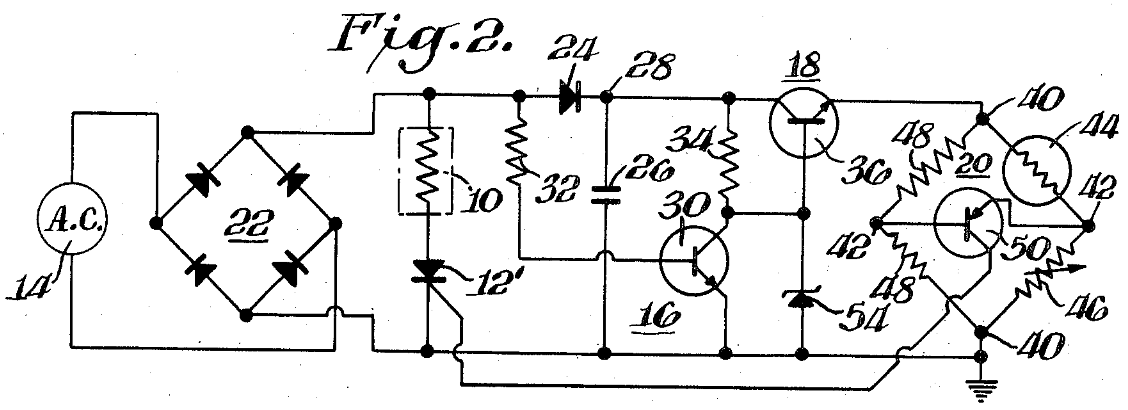
FIG. 2 is a schematic diagram of a preferred embodiment of this invention illustrated in FIG. 1.

The details of the preferred embodiment of this invention are illustrated in the schematic diagram of FIG. 2. In this preferred embodiment, rather than connecting the utilization device 10 and switching means 12 directly across the alternating source 14 as was the case in the embodiment of FIG. 1, the alternating current source 14 is connected across a full-wave rectifier 22 of conventional design. The output of the full-wave rectifier 22, which may comprise a bridge circuit or rectifiers appropriately poled, is connected across the series combination of the utilization device 10, which in this instance may be the heating element of an electric oven, connected in series with a silicon controlled rectifier 12'. The controlled rectifier 12' is poled in the circuit to receive only the positive going, double frequency pulses from the full-wave rectifier 22. Also connected across the output of the full-wave rectifier 22 is a rectifier-type power supply including a rectifier diode 24 connected in series with a storage capacitor 26. The junction point 28 between the rectifier 24 and capacitor 26 provides a source of filtered direct current which is used to energize the crossover detector 16 and pulsed power source 18.

The crossover detector 16 includes an NPN transistor 30 having base, emitter, and collector electrodes. The unfiltered full-wave rectified voltage is positive going with respect to a point of reference potential or ground. The emitter electrode of the transistor 16 is connected to ground. The D.C. supply voltage available at the terminal 28 with respect to ground is applied through a collector resistor 34 to the collector electrode of the transistor 30. In addition, the collector electrode of the transistor 30 is connected to the base electrode of an NPN transistor 36 which forms the pulsed power source 18. To complete the pulsed power source, the collector electrode of the transistor 36 is connected to the D.C. terminal 28.

The output of the pulsed power source is derived from the emitter electrode of the transistor 36 and is connected across the input terminals 40 of the bridge network forming the detecting means 20 to ground. Thus the bridge is energized, not by a direct current voltage, but rather by a pulse signal. A Zener diode 54 is connected between ground and the collector electrode of the crossover detector transistor 30 to control the amplitude of the voltage pulses applied to the bridge. The bridge 20 includes a pair of output terminals 42 and four arms connected between the respective input and output terminals 40 and 42, respectively.

A heat sensitive element 44, which may be a thermistor, platinum element, or other condition responsive impedance varying device makes up one arm of the bridge and is connected in series with a set point potentiometer 46 between the input terminals 40. The heat sensing element 44 is physically positioned within or contiguous to the oven so as to sense its temperature. In like manner, a pair of resistors 48 form the remaining arms of the bridge and are connected in series with each other and in parallel with the series connected sensor 44 and set point potentiometer 46. The respective junction points between the fixed resistors 48 and between the sensor element 44 and potentiometer 46 constitute the output terminals 42 of the bridge. An output transistor 50 (PNP type) permits amplification of the output from the bridge. The output transistor 50 has its emitter-base circuit connected across the output terminals 42 of the bridge and its collector electrode connected directly to the firing electrode of the silicon controlled rectifier 12'.

In operation, the unfiltered, full-wave rectified voltage derived from the full-wave rectifier 22 is applied through the base resistor 32 of the crossover detector transistor 30. This transistor is normally saturated at all times except for the very short period of time occurring in the vicinity of the zero-crossover point of the line voltage. At this point, the transistor 30 is cutoff by the positive going, full-wave signal returning to zero or ground. The voltage at its collector electrode rises rapidly to a limit determined by the Zener diode 54. Typically, this limit may be 30 volts. Since the collector electrode of the transistor 30 is directly connected to the base electrode of the switching transistor 36, the pulsed power source 18 conducts at this time to pass a pulse from the collector electrode of the transistor 30 directly across the bridge circuit 20.

As the full-wave rectified signal from the rectifier 22 leaves the zero axis and again rises in a positive going direction, the crossover detecting transistor 30 again is driven into saturation. The voltage at its collector electrode immediately drops to zero or ground as does the voltage applied to the bridge circuit. With the circuit illustrated, the "on" time or duration of the pulse applied to the bridge circuit 20 is approximately one hundred microseconds. This time may be varied by referencing the emitter electrode of the transistor 30 to some point other than ground.

Depending now upon the balance condition of the bridge circuit 20, any bridge output pulse is amplified by the output transistor 50 and applied to the firing electrode of the silicon rectifier 12'. Since the silicon controlled rectifier 12' is connected across the output of the full-wave bridge rectifier, it can conduct on both the positive and negative half cycles of line voltage. Power is thus supplied to the heating element in the oven 10 whenever there are variations from the preselected temperature as established by the set point potentiometer 46 of the bridge circuit in accordance with known techniques. This circuit has the many advantages set forth hereinbefore. Typically one-quarter watt rated resistors and transistors may be employed without danger of their burning out.

Figure 3:
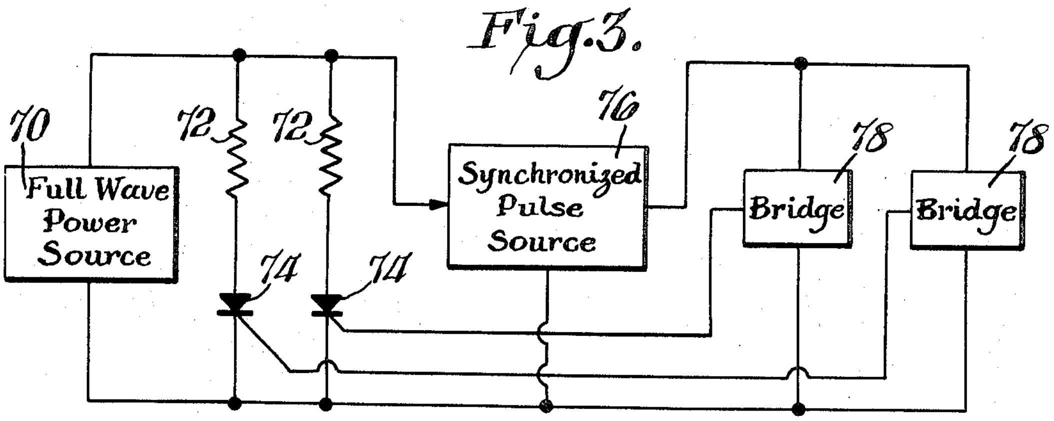
FIG. 3 is a partial block, partial schematic diagram of an alternative embodiment of this invention.

The system illustrated in FIG. 3 utilizes many of the same elements described hereinbefore, but represents another embodiment of the invention whereby, at small additional cost, several bridge circuits can be operated from a single crossover detector and pulsed power source. Each bridge circuit controls corresponding different heating elements. Thus in FIG. 3 a full-wave power source denoted by the block 70 is illustrated. The power source 70 may be considered as including the A.C. source 14 and the full-wave rectifier 22 of FIG. 2. The output of the power source is connected across a pair of series of circuits each including series connected heating elements 72 and corresponding silicon controlled rectifiers 74. The series circuits 72–74 are connected in parallel across the power source 70. A synchronized pulse source 76 is also connected to the output of the full-wave source 70 and may be considered as including the crossover detector 16 and the pulsed power source 18 of FIG. 2. The pulse output from the synchronized pulse source 76 is applied simultaneously to a pair of bridge circuits 78 connected in parallel across the output of the pulse source 76.

The sensor element (not shown) of each of the bridges 78 may be connected to sense the temperature of a different oven heated by respective ones of the heating elements 72. Thus as one or the other of the ovens departs from the predetermined value as established by its set point potentiometer 46 (FIG. 2), the power supplied the respective one of the heating elements 72 is increased or decreased accordingly. Each heating element 72 thus is separately and independently controlled by its own separate bridge circuit, both bridge circuits being excited by the same pulse source. Although only two are shown, several bridges and their accompanying switching means can be excited by the same synchronized pulse source 76.

There has been described a relative low cost system for increasing the sensitivity of sensing bridge circuits. The system may form part of a temperature controller and permits the use of low power rated components and requires a relatively small number of components for the complete system.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. A control circuit for providing a controlled output from an alternating current power source in accordance with variations of a system from a preselected physical condition comprising:

pulse forming circuit means energized by the alternating current source for providing energizing pulses in synchronism with the zero-crossover times of said alternating current power source, said energizing pulses having a predetermined duration which is short in relation to the duration of each half cycle of alternating current from said source;

detecting means energized by said short duration energizing pulses for sensing said condition variations in coincidence with said energizing pulses, said detecting means providing output pulse signals synchronized with said energizing pulses and corresponding to said condition variations; and switching means coupled to said power source and responsive to said output pulse signals for selectively switching current from said source in synchronism therewith.

2. A circuit in accordance with claim 1 wherein said detecting means includes a bridge circuit having an input, four arms, and an output, one arm of said bridge circuit including an element whose impedance varies in accordance with said physical condition, said input being coupled to said pulse forming circuit means to receive said short duration energizing pulses, and said output being operative to provide said output pulse signals to said switching means.

3. A circuit in accordance with claim 2 wherein said switching means includes a controlled rectifier having a main current carrying path connected to said source, and a gate control input connected to receive said output pulse signals.

4. A circuit in accordance with claim 1 wherein said pulse forming circuit means includes:

a full-wave rectifier connected to said source for providing synchronizing pulses having a recurrence frequency twice that of said power source, a first transistor operatively connected to be driven from saturation to cutoff with the occurrence of each of said synchronizing pulses, thereby to generate gating pulses, and a second transistor operatively connected to said first transistor to generate said short duration energizing pulses in response to said gating pulses.

References Cited

UNITED STATES PATENTS

| | | | |
|---|---|---|---|
| 3,226,626 | 12/1965 | Moore | 323—22 X |
| 3,283,179 | 11/1966 | Carlisle et al. | 307—133 |
| 3,293,455 | 12/1966 | Gombill | 307—310 |
| 3,381,226 | 4/1968 | Jones et al. | 307—133 |
| 3,435,329 | 3/1969 | Hunter | 323—22 |
| 3,444,456 | 5/1969 | Cadichini | 307—133 X |

JOHN S. HEYMAN, Primary Examiner

R. C. WOODBRIDGE, Assistant Examiner

U.S. Cl. X.R.

307—133, 232, 257, 311; 323—22